May 2, 1933.  D. SIMON  1,906,643
SHOCK ABSORBER
Filed Dec. 26, 1929
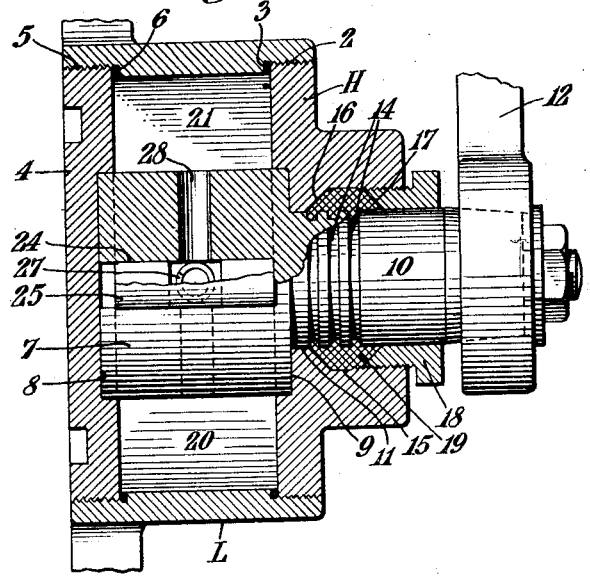
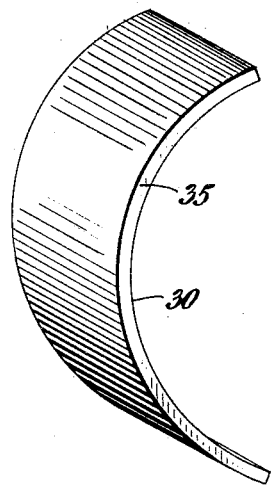
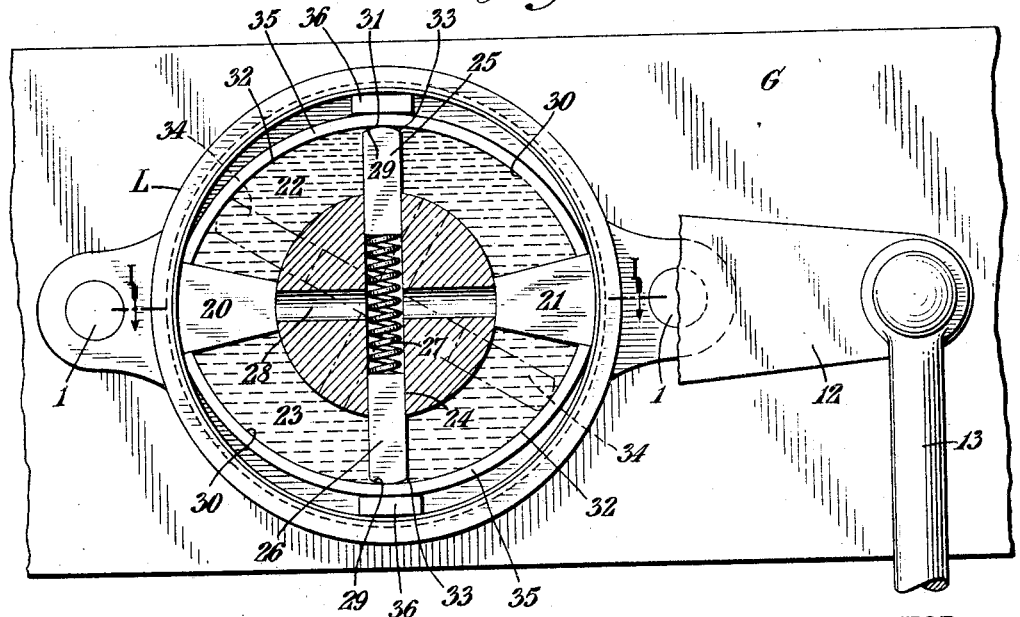
INVENTOR
Desiderius Simon.
BY
HIS ATTORNEY Patented May 2, 1933

1,906,643

UNITED STATES PATENT OFFICE

DESIDERIUS SIMON, OF LONG ISLAND CITY, NEW YORK

SHOCK ABSORBER

Application filed December 26, 1929. Serial No. 416,510.

This invention relates to a shock absorber for automobiles and similar vehicles, the same being an improvement over the shock absorbers shown and described in Patent Number 1,580,926, and in pending application Serial No. 717,967.

It is a purpose of the present improvement to provide a shock absorber embodying all of the advantages of its predecessors but being more efficient in its operation, more easily manufactured, and more durable in use.

A more detailed object is to so improve the construction that the "shock" and "rebound" movements of the vehicle body will be efficiently accommodated and cushioned during use of the device.

A further object is to provide means whereby a given size of device may be used upon vehicles of widely different sizes and types.

A further object is to provide for the easy removal and substitution of parts which are subject to wear in use.

A further object is to provide for the easy manufacture and assembly of all parts entering into the device.

A further object is to provide efficient means for preventing the leakage of oil from within the device during use.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a vertical sectional view taken substantially upon the plane of line 1—1 of Fig. 2.

Fig. 2 is a side elevational view of the parts appearing in Fig. 1, the cover being removed, and parts being shown in section for the better disclosure of details, the whole being mounted upon the side member of a vehicle as in use, and Fig. 3 is a detail perspective view of one of the inner wall members of the casing.

Referring to the drawing for describing in detail the structure illustrated therein, the reference character L indicates the main body or casing of the device. This is mounted upon one of the movable parts of the vehicle, as for instance on the side frame G, and may be secured thereto as for instance by means of bolts or the like, as 1—1.

The cover H is provided, preferably connected with the body L by having screw connection therewith as indicated by the reference character 2, there being provided a suitable gasket or the like, as 3, so that when said cover is screwed home it will provide a sufficiently tight joint to prevent possible passage of liquid between the cover and body.

The rear or bottom wall as 4 of the body may if desired be formed separately from the remainder of the body and may be attached by any suitable means such for instance as by a screw connection indicated at 5, with interposed gasket 6.

Within the body and held between the cover H and the rear wall 4 is a cylindrical rotor 7. The inner end of this rotor extends into a seat as 8 provided as a bearing to receive it in the inner face of the wall 4. The outer end of the rotor extends into a similar seat as 9 provided as a bearing to receive it in the inner surface of the cover H.

From the outer end of the rotor a concentric extension 10 projects through a bearing 11 provided centrally through the cover H and to the outer end of this extension an operating lever 12 is connected exteriorally of the casing.

Any suitable form of stuffing or packing box may be provided for properly sealing the joint where the extension 10 passes through the cover against possible egress of fluid from within the casing, it being understood of course that the outer end of the lever 12 is intended to be connected with a relatively independently movable portion of the vehicle as for instance the vehicle axle, a suitable connecting link as 13 being illustrated for this purpose. The form of packing illustrated in the present instance contemplates that the extension or shaft 10 shall be provided with one or more annular grooves as 14 which open into an annular cavity 15 provided within the cover H, the inner and outer walls as 16 and 17 of which cavity are beveled, the former being provided upon the cover H and the latter being provided at the inner end of a separately formed gland 18 which is threaded into the cover so that the packing material, as 19, confined between the beveled walls will be forced into the grooves 14 by forced inward movement of the gland, as will be readily understood by inspection of the drawing Fig. 1.

The interior of the casing is considerably larger than the diameter of the rotor and a pair of partition members as 20 and 21 are arranged in diametrically opposite positions so that the space within the casing between the exterior annular surface of the rotor and the interior surface of the casing is divided into two separate compartments as 22 and 23.

The inner radial edge portions of the partitions 20 and 21 have rubbing contact with the rotor.

Extending diametrically through the rotor is a rectangular slideway 24, and within this slideway is mounted a pair of paddles as 25 and 26. The slideway is arranged so that in the normal position of the rotor the paddles will extend in a substantially vertical plane, that is one paddle will project into the compartment 22 and the other into compartment 23. In this position the paddles will stand midway between the partitions 20—21 which it will be noted are in a relatively horizontal plane, as illustrated by full lines in Fig. 2.

A suitable compression spring 27 is provided within the slideway positioned between the inner end surfaces of the paddles for constantly urging the paddles radially outwardly.

Extending diametrically entirely through the rotor, at right angles to the plane of the paddles, is a passage 28 communicating with the slideway 24 so that oil from the compartments 22 and 23 may readily move into and out of the space between the inner ends of the paddles, as will be presently again referred to.

Normally, that is when the rotor is in the position as indicated in Fig. 2, the opposite ends of the passage 28 will be substantially closed by the inner ends of the partition members 20—21. Rotary movement of the rotor will at other times move the passage into free communication with the compartments 22—23.

The outer end surfaces as 29—29 of the paddles are designed for rubbing against the opposing inner wall surfaces of the respective compartments. These inner wall surfaces as 30—30 of the compartments are so shaped as to be non-concentric with the centre of the rotor. Each provides what may be termed a central or contact surface portion 31 with which the outer ends 29 of the paddles engage when the paddles are in their normal vertical position of rest, and at opposite sides of this central or contact portion each provides a surface portion 32 which curves gradually outwardly away from the rotor. This outward curvature is substantially identical at both sides of the contact portion and continues to the partitions 20—21, so that the contact portions, although spaced an appreciable distance from the rotor are yet relatively closer to the rotor than the surfaces 32—32 and serve to normally hold the paddles in inner positions.

The outer end surfaces 29 of each of the paddles is made quite broad and is curved in the arc of a circle which is of less radius than the curvature of the surfaces 32 and this is important since when the paddles are in their normal vertical positions it provides wedge shaped openings or crevices as 33—33 at opposite sides of each paddle into which oil may move and produce a pressure for urging the paddles diametrically inwardly against tension of spring 27. When the paddles move to one side or the other of the contact portion 31 the wedge shaped openings will change in proportions relative to each other, due to the non-concentric curvature of the surfaces 32, the opening 33 at one side becoming relatively larger and the opening 33 at the opposite side becoming relatively smaller and finally disappearing entirely as the paddle reaches maximum throw, as indicated by the dotted lines in Fig. 2.

The operation of the device may now be understood as follows:

The casing being entirely filled with oil or other suitable fluid, and being connected with a body as G of the vehicle, and the link 13 being connected with the axle or other relatively movable part of the vehicle, as is common with devices of this type, the rotor will be caused to oscillate more or less rapidly and to greater or less extent dependent upon the character of roadway over which the vehicle is passing.

If the vehicle is moving over relatively smooth roadway there will be only slight relative movement between the vehicle axle and the body, and consequent slight rotary movement of the rotor. It is desirable that at this time the vehicle springs shall function softly and easily and with only slight restraint. The slight movement of the paddles in first one direction and the in the other will tend to compress the fluid in front of them. This pressure will be exerted against the exposed curved end surfaces of the paddles in the openings 33 and will move the paddles inwardly to an extent determined by the amount of pressure and sufficient to relieve the pressure by permitting movement of the oil to the opposite side of the paddles. This displacement of fluid imposes some restraint against free movement of the rotor, and the amount of this restraint is dependent upon the size of the openings 33, the tension of spring 27, amount of leakage provided, and upon other incidental elements all of which may be readily made to conform with the requirements desired to be met for any particular vehicle.

When the vehicle is travelling over a rougher roadway, so that excessive flexing of the vehicle springs is produced and there is a consequent tendency of excessive "rebound" of the vehicle body, then the maximum "shock" absorbing quality of this device is called into use. At each "shock" movement of the vehicle parts the rotor will move violently in one direction so that the paddles will be carried to considerable distances beyond the central or contact parts 31 of the casing walls, as for instance to the position indicated by the dotted lines 34. During this movement the spring 27 will urge the paddles to follow in contact with the wall surfaces 32, but the pressure of fluid in front of the paddles and against the end surfaces 29 of the paddles will force the paddles inwardly against spring 27 and thus facilitate desirable easy movement of the rotor at this time. When the rotor has reached its extreme, and is about to return, the pressure against the ends of the paddles is relieved and the spring 27 becomes instantly effective to move the paddles outwardly against the casing wall as the paddles attempt now to move backwardly. In this position there is little or no end surface of the paddle exposed to oil pressure against the reverse side of the paddle. The pressure in the two compartments 22 and 23 will be equalized through the passage 28 now in open communication with both compartments, and this pressure will also be exerted against the inner ends of the paddle. The pressure in the two comrially supplement the spring 27 in urging the paddles outwardly. With the elements in this condition return of the rotor to normal will be very powerfully restrained. A desirable amount of leakage of oil from one side to the other of the paddles will however enable the paddles to gradually move toward normal vertical position.

If a "shock" movement be encountered before the paddles have fully returned to normal the action already described will be again repeated.

As an effective mechanical expedient by which to provide the non-concentric inner wall surfaces 30 the present improvement proposes that these surfaces be comprised in separately formed wall members as 35—35 one of which members is shown in detail in Fig. 3 of the drawing. The main casing may be made perfectly cylindrical, both inside and outside, and the members 35 may be placed within this casing at opposite sides of the partitions 20—21 and may be suitably fixed by means of appropriate filler blocks as 36—36. The members 35—35 may thus be made of any appropriate interior surface contour, and the blocks 36 may be of appropriate size to hold them in desired positions, and here it may be noted that the non-concentric contour of the inner surfaces of these members with respect to the centre of the rotor not only provides for co-operative effect with the ends of the paddles for determining size of the openings 33—33 in relation to the distance to which the paddles move to one side or the other of normal, but it also provides gradual enlargement of the compartments 22—23 toward opposite ends thus affording an increase in the quantity of oil to be displaced by the paddles progressively for each degree of movement as the paddles move to greater distances away from normal. In addition to this it is effective during "shock" movements of the paddles to provide an increasing amount of space between the ends of the paddles and the opposing wall surface as the paddles move away from the portions 31 so that it is not necessary for the paddles to be pressed inwardly to any great extent to allow movement of oil past their ends at this time.

The members 35 are herein shown as being perfectly semi-circular both in interior and exterior contour and this has been found in practice to produce satisfactory results. They may be readily replaced when worn or they may be substituted by members having greater or less radius according to the requirements of any particular vehicle.

Casings of a given size may be manufactured in quantity and members 35 of one curvature may be placed therein for use on a given size of vehicle while members of a different curvature may be utilized for vehicles of a different size. This avoids necessity for making the entire mechanism in various different sizes.

The parts may be very easily assembled, it being required merely to place the rotor in a position and screw the cover tight over it. Nothing is present which is likely to get out of order. All of the parts are heavy and substantial and thus the entire mechanism is rendered capable of efficient service indefinitely.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent, is:

1. A shock absorber for vehicles, comprising a casing adapted to be connected with one part of the vehicle, a rotor arranged within said casing, an operating arm connected with said rotor and having connection with a relatively movable part of the vehicle to rotate the rotor, the casing being adapted to contain a quantity of fluid, partitions within the casing co-acting with the rotor to divide the interior of the casing into separate compartments, and paddles projecting from the rotor into said compartments respectively adapted to utilize the fluid within said compartments for cushioning movements of the rotor, said paddles being spring pressed towards the outer walls of said compartment, said outer walls comprising wall members formed separately from the casing and insertible into and removable from the casing each of said members having its inner surface shaped to provide contact parts spaced away from the rotor and arranged to be engaged by the outer ends of the paddles when the paddles are in normal position, said inner surfaces being non-concentric with the rotor and inclining outwardly away from the rotor at opposite sides of said contact parts, together with filler blocks formed separately from said wall members and from the casing adapted to be removably positioned between the wall members and the casing to hold said wall members in operative position.

2. A shock absorber for vehicles, comprising a casing adapted to be connected with one part of the vehicle, a rotor arranged within said casing, an operating arm connected with said rotor and having connection with a relatively movable part of the vehicle to rotate the rotor, the casing being adapted to contain a quantity of fluid, partitions within the casing co-acting with the rotor to divide the interior of the casing into separate compartments, and paddles projecting from the rotor into said compartments respectively adapted to utilize the fluid within said compartments for cushioning movements of the rotor, the outer walls of said compartments each comprising a wall member formed separately from the casing and insertible into and removable from the respective compartment, each of said wall members having its inner surface disposed to be traversed by the paddles shaped so as to be non-concentric with the rotor and symmetric at opposite sides of the normal position of the paddles.

3. A shock absorber for vehicles, comprising a casing adapted to be connected with one part of the vehicle, a rotor arranged within said casing, an operating arm connected with said rotor and having connection with a relatively movable part of the vehicle to rotate the rotor, the casing being adapted to contain a quantity of fluid, partitions within the casing co-acting with the rotor to divide the interior of the casing into separate compartments, and paddles projecting from the rotor into said compartments respectively adapted to utilize the fluid within said compartments for cushioning movements of the rotor, the outer walls of said compartments comprising wall members formed separately from the casing and removably held in position between said partitions, each of said removable wall members having its inner surface disposed to be traversed by the paddles shaped so as to be non-concentric with the rotor.

In testimony whereof I affix my signature.

DESIDERIUS SIMON.